March 3, 1964   G. E. GROSS ETAL   3,123,651
IMPELLER DEVICE
Filed Jan. 21, 1960
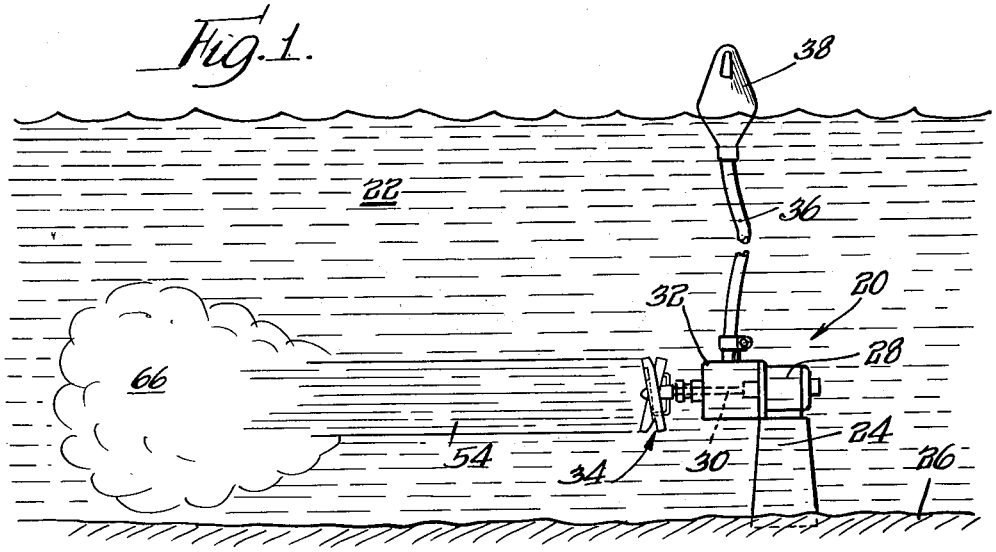
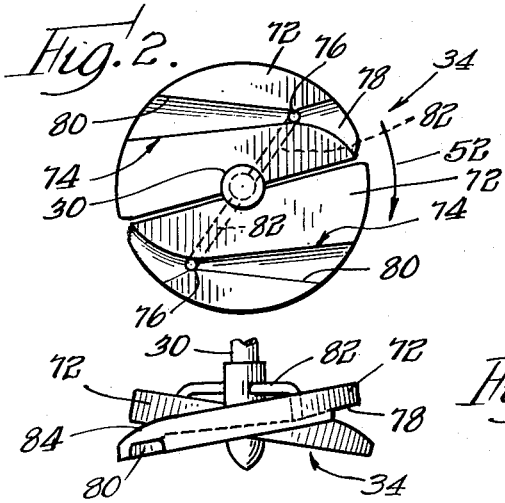
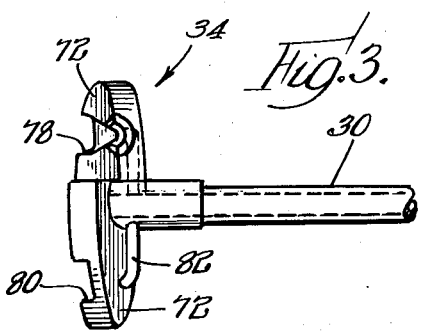
INVENTORS
George E. Gross
William H. Cramer, Jr.
By: Olson & Trexler attys.

3,123,651
IMPELLER DEVICE
George E. Gross, 836 S. Maple St., and William F. Cramer, Jr., 428 S. Harvey, both of Oak Park, Ill.
Filed Jan. 21, 1960, Ser. No. 3,812
1 Claim. (Cl. 261—24)

This invention relates to an impeller device.

A general object of the present invention is to provide a new and improved impeller device.

Another object of the invention is to provide a novel impeller device that can be arranged to distribute one fluid in another fluid.

Yet another object of the invention is to provide a novel impeller device that can be arranged to distribute a gas in a liquid.

Yet another object of the invention is to provide an improved aerating device for bodies of water.

A further object of the invention is to provide a novel impeller device that can be arranged to cause directed movements in a fluid body.

A still further object of the invention is to provide a novel impeller device that can be arranged to cause directed movements in a fluid body from stratas of one temperature to stratas of a different temperature.

And a still further object of the invention is to provide improved means for establishing and maintaining ice-free areas in bodies of water normally frozen over in the wintertime.

Additional objects and features of the invention pertain to the particular structure and arrangements whereby the above objects are attained.

The invention, both to its structure and mode of operation, will be better understood by reference to the following disclosure and drawings forming a part thereof, wherein:

FIG. 1 is a schematic side view of an aerating device constructed in accordance with the invention;

FIG. 2 is a front elevational view of a rotor used in the device of FIG. 1;

FIG. 3 is a side elevational view of the rotor of FIG. 2; and

FIG. 4 is a plan view of the rotor of FIG. 2.

Referring now in detail to the drawings, specifically to FIGS. 1–3, an aerating device shown generally at 20 is aimed horizontally and is submerged in a body of water 22, as by being mounted to a concrete base or pedestal 24 that is anchored in the floor or bed 26. Other advantageous arrangements of the aerating device 20 may, of course, be employed.

The aerating device 20 includes a drive motor 28 which is suitably provided with motive power. The output shaft 30 of motor 28 extends through a chamber 32 so as to have a rotor 34 fixed adjacent its free end. Suitable bearings and shaft seals are provided as is required.

Chamber 32 is arranged to communicate with the atmosphere by means of a flexible hose 36, as shown, or by a rigid conduit. Flexible hose 36 is desirably joined to a floating buoy 38 to insure proper exposure to the atmosphere. Shaft 30 is advantageously hollowed and provided with radial apertures flowpathwise connecting the interior of the shaft with the interior of chamber 32.

Referring now to FIGS. 2–4, the rotor 34 comprises two similar, hemi-disk-shaped blades 72 affixed to the shaft 30. On the downstream face of each of the blades 72, there is provided a channel element 74 which defines a throat or constricted portion 76 at the juncture of sharply tapering, leading end portion 78 and the more gently tapering, trailing end portion 80. In accord with the invention, a tube 82 communicates the throat 76 with the interior of hollowed shaft 30 in a similar manner to the tubes 40 discussed hereinabove.

As is best shown in FIG. 4, the blades 72 are oppositely angulated relative to the shaft 30 in order to provide increased impelling action. It is also important to note that the blades 72 have a bevel 84 situated at the trailing edge.

When drive motor 28 rotates the rotor 34, a horizontal column of water 54, shown in FIG. 1, will be directed through the body of water 22; and due to the aspirator effect of the water passing through the channel elements 74, gases from the atmosphere will be drawn through the hose 36 into the chamber 32, through the hollow shaft 30 and through the tubes 82 to be dispersed in the column 54. With reference again to FIG. 1, it will be seen that column 54 rapidly expands into a cloud 66 at its terminus.

As will be apparent, the aerating device 20 is capable of distributing large quantities of minute bubbles of air through a body of water such as is shown generally at 22. It will likewise be apparent that the device can also be advantageously arranged to pump fresh air to a diver, as for example, to a diver operating a diving bell-type tank.

While particular embodiments of the invention have been shown and described, it should be understood, of course, that the present invention is not limited thereto since many modifications may be made; and it is, accordingly, contemplated to cover by the appended claim any such modifications as fall within the true spirit and scope of the invention.

The invention is claimed as follows:

An impeller device for disposition in a first fluid to disperse a second fluid therein comprising: rotatable shaft means, radially extending means on said shaft means including a plurality of hemi-disk-shaped impeller blades having outer ends, leading edges and trailing edges, said blades each having a pitch thereto providing an upstream side and a downstream side for a predetermined direction of rotation of said shaft means; open-face channel means on each of said blades inwardly of said blade ends opening on the downstream side of said blades and each having an inlet end adjacent the leading edge and an outlet end adjacent the trailing edge of the respective blade for receiving a flow of said first fluid upon rotation of said shaft means and said radially extending means in a first fluid, each channel defining a Venturi having a restriction therein; and conduit means opening into said channel means Venturi at the restriction therein and leading to a source of a second fluid for aspirating said second fluid into said first fluid.

References Cited in the file of this patent
UNITED STATES PATENTS

| | | |
|---|---|---|
| 272,516 | Barnes | Feb. 20, 1883 |
| 283,323 | Bruton | Aug. 14, 1883 |
| 1,639,828 | Wheeler et al. | Aug. 23, 1927 |
| 1,779,181 | McDonald | Oct. 21, 1930 |
| 2,743,914 | Epprecht | May 1, 1956 |
| 2,777,290 | Bailey | Jan. 15, 1957 |
| 2,800,315 | Griesbach | July 23, 1957 |
| 2,825,542 | Jackson | Mar. 4, 1958 |
| 2,862,680 | Berger | Dec. 2, 1958 |
| 2,914,920 | Paradiso | Dec. 1, 1959 |
| 2,950,763 | Bennett | Aug. 30, 1960 |

FOREIGN PATENTS

| | | |
|---|---|---|
| 469,138 | Canada | Nov. 7, 1950 |
| 863,484 | France | Jan. 2, 1941 |